United States Patent [19]

Hadgis

[11] Patent Number: 5,357,581
[45] Date of Patent: Oct. 18, 1994

[54] METHOD AND APPARATUS FOR THE SELECTIVE FILTERING OF DOT-MATRIX PRINTED CHARACTERS SO AS TO IMPROVE OPTICAL CHARACTER RECOGNITION

[75] Inventor: George A. Hadgis, Rochester, N.Y.

[73] Assignee: Eastman Kodak Company, Rochester, N.Y.

[21] Appl. No.: 786,476

[22] Filed: Nov. 1, 1991

[51] Int. Cl.⁵ .................................................. G06K 9/36
[52] U.S. Cl. ............................................ 382/9; 382/48; 382/54
[58] Field of Search .................... 382/9, 21, 25, 27, 48, 382/54

[56] References Cited

U.S. PATENT DOCUMENTS

| | | | |
|---|---|---|---|
| H681 | 9/1989 | Weidman | 382/11 |
| 3,634,822 | 1/1972 | Chow | 340/146.3 S |
| 3,737,855 | 6/1973 | Cutaia | 340/146.3 AG |
| 3,764,980 | 10/1973 | Dansac et al. | 340/146.3 ED |
| 4,163,213 | 7/1979 | Nadler | 340/146.3 D |
| 4,263,504 | 4/1981 | Thomas | 235/454 |
| 4,274,079 | 6/1981 | Todd et al. | 340/146.3 FT |
| 4,339,209 | 7/1982 | Tanigami | 400/142 |
| 4,484,068 | 11/1984 | Mazumder | 235/462 |
| 4,528,692 | 7/1985 | Umeda et al. | 382/9 |
| 4,559,644 | 12/1985 | Kataoka et al. | 382/9 |
| 4,561,022 | 12/1985 | Bayer | 358/167 |
| 4,646,355 | 2/1987 | Petrick et al. | 382/54 |
| 4,680,805 | 7/1987 | Scott | 382/22 |
| 4,691,366 | 9/1987 | Fenster et al. | 382/54 |
| 4,783,840 | 11/1988 | Song | 382/54 |
| 4,910,787 | 3/1990 | Umeda et al. | 382/25 |
| 5,073,959 | 12/1991 | Sugiura et al. | 382/22 |
| 5,182,778 | 1/1993 | Rudak et al. | 382/54 |
| 5,193,127 | 3/1993 | Bernsen et al. | 382/48 |
| 5,212,741 | 5/1993 | Barski et al. | 382/51 |

FOREIGN PATENT DOCUMENTS 57-29186 2/1982 Japan.
62133585 2/1982 Japan.

Primary Examiner—David K. Moore
Assistant Examiner—Andrew W. Johns
Attorney, Agent, or Firm—Dennis R. Arndt

[57] ABSTRACT

Method and apparatus for locating dot-matrix printed text in a digital image and filtering only those regions determined to contain dot-matrix printed text. The apparatus incorporates a detection algorithm with a digital filter. The system detects dot-matrix printed text and selectively turns the filter on or off within regions of the digital image, thereby improving read rates of dot-matrix printed text while not affecting read rates of higher quality machine printed text.

4 Claims, 13 Drawing Sheets

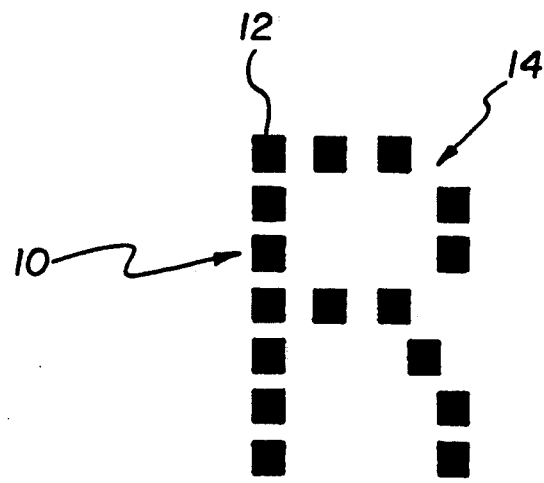
FIG. IA
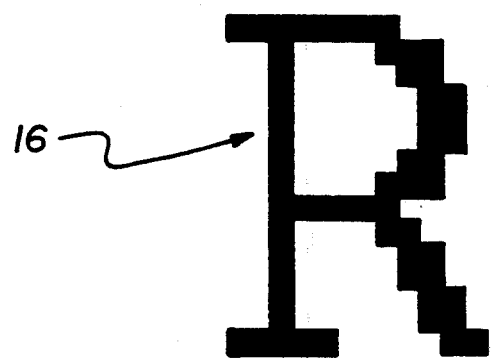
FIG. IB

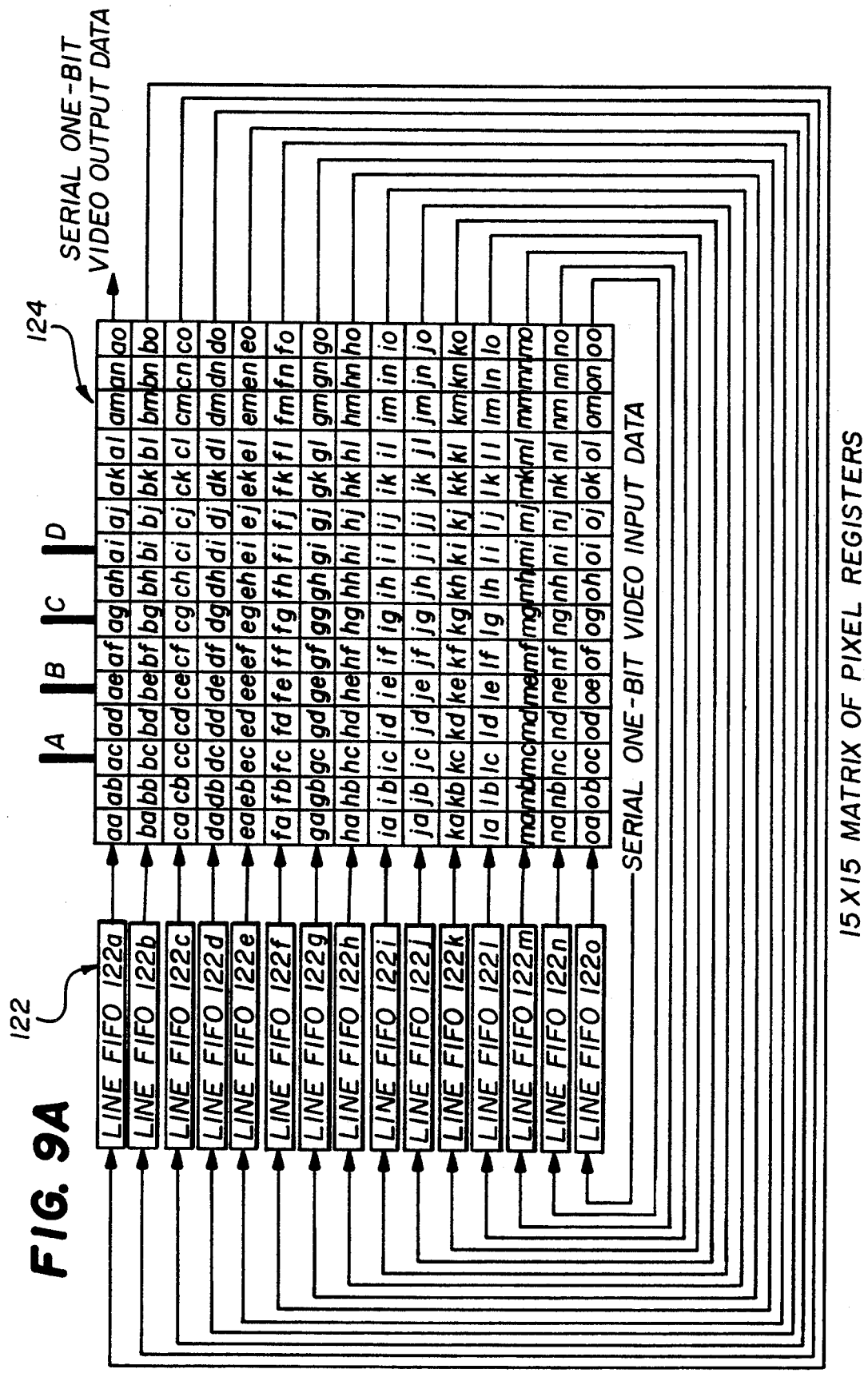

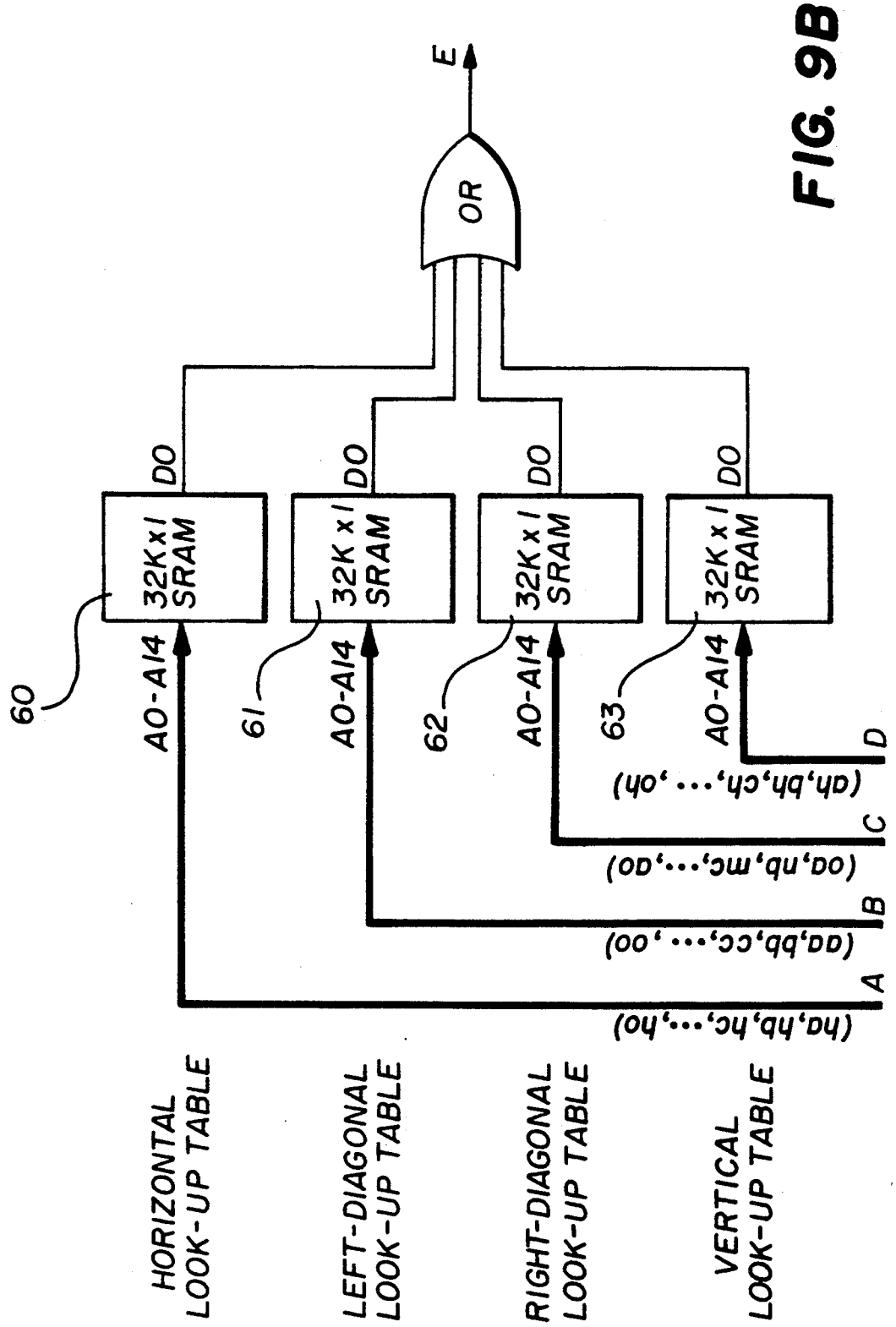

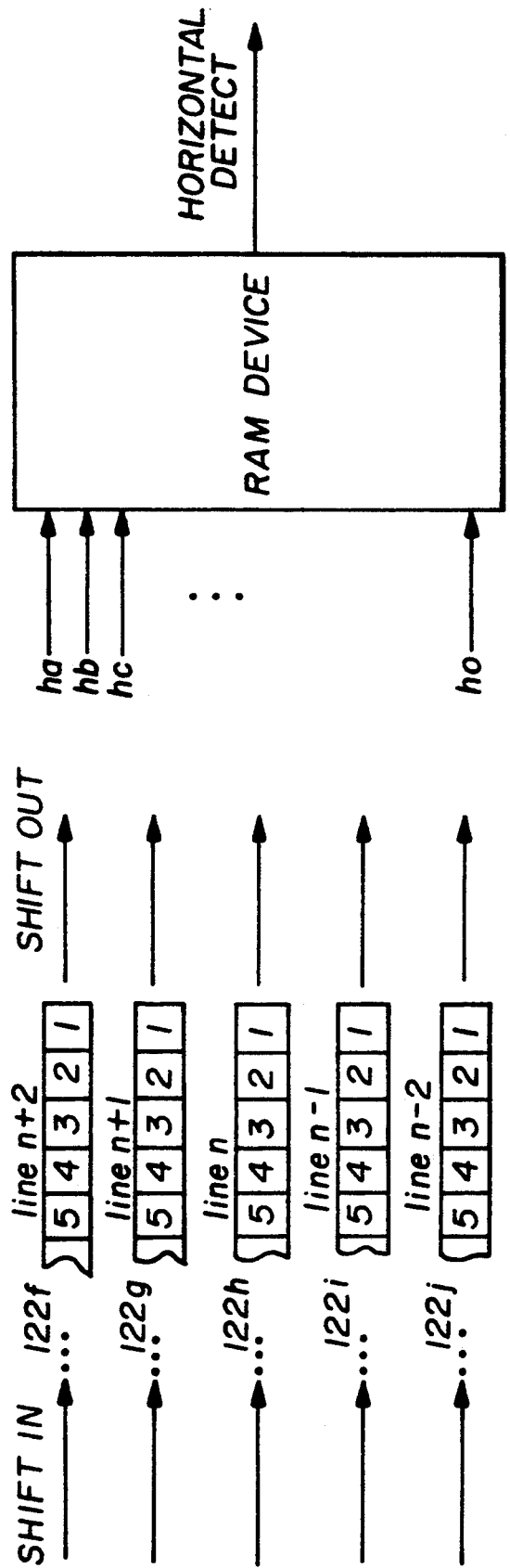

METHOD AND APPARATUS FOR THE SELECTIVE FILTERING OF DOT-MATRIX PRINTED CHARACTERS SO AS TO IMPROVE OPTICAL CHARACTER RECOGNITION

CROSS-REFERENCE TO RELATED APPLICATIONS

Reference is made herein to commonly-assigned, copending U.S. patent application Ser. No. 786,474, entitled METHOD AND APPARATUS FOR THE DETECTION OF DOT-MATRIX PRINTED TEXT SO AS TO IMPROVE OPTICAL CHARACTER RECOGNITION, in the name of G. Hadgis, filed concurrently herewith.

Technical Field

The present invention relates to a system for locating dot-matrix printed text within a binary digital image and filtering those regions of the document image determined to contain dot-matrix printed text. Determined by certain characteristics of dot-matrix printed text, the neighborhoods of pixels are flagged as containing dot-matrix printed text. These neighborhoods are identified by creating a map or filter mask which identifies the locations of all dot-matrix printed text. A control system is then used to determine whether a given neighborhood of pixels should be processed using the filter algorithm.

Accordingly, only those areas within the given image that have been determined to contain dot-matrix printed text are enhanced for improved optical character recognition.

Background of the Invention

Optical Character Recognition (OCR) algorithms currently are being used in a wide variety of applications for converting digitized image data of characters to their ASCII equivalents. This is especially useful in data entry applications where thousands of documents are processed daily. For example, in processing health claim forms, many insurance carriers currently enter the data into their data base via data entry personnel. By taking advantage of OCR, the data can be entered into a data base more accurately and with a higher throughput, thereby reducing the associated costs.

OCR is especially applicable for typewritten fonts such as gothic or courier. OCR readability of these types of fonts is quite good. However, in the health insurance industry mentioned above, claim forms are received from many different sources. Some of these forms may be filled out using a typewriter, some may be filled out by hand, while others may be done on a dot-matrix printer. Sorting of these incoming documents allows the insurance carrier to use an OCR device to read the typewritten documents and manual data entry for the hand-printed documents. However, dot-matrix documents pose a bit of a problem, since they are machine generated (not as easy to sort as typed vs. hand-printed) but the quality of print generates lower OCR read rates (and therefore more manual data entry to fix the mistakes).

Recognition rates for typewritten text are quite good due to the consistent quality of the print. For example, a gothic letter "S" is very similar to a courier "S", yet either "S" is easily distinguishable from a number "5". Although dot-matrix characters of different printers also look similar, there is less information to distinguish a "5" from an "S". This is especially true for 9 pin draft-quality dot-matrix—typical of less expensive printers. The individual dots forming the characters tend to confuse OCR algorithms that haven't been specifically developed for dot-matrix printed text, thereby reducing accuracy.

OCR algorithms that have been trained on continuous fonts such as those obtained from a typewriter, recognizes the characters much more accurately than those obtained from dot-matrix printers. It has been shown that read rates for dot-matrix printed text can be increased by filtering the image data as described in U.S. patent application Ser. No. 575,715, entitled DOT-MATRIX ENHANCEMENT FOR OPTICAL CHARACTER RECOGNITION. Unfortunately, use of this filter required that the user separate the dot-matrix printed documents from the typewritten document because the filter distorts typewritten text images beyond acceptable recognition by the OCR algorithm. Another disadvantage is that the video information to be "read" by the OCR algorithm for a given document must all be of the same type (i.e. either dot matrix printed text or typewritten text, but not both). It is for this reason that it is important to be able to distinguish dot-matrix printed text from typewritten text.

By combining a dot-matrix filter with a dot-matrix detection circuit, such a system will locate those regions which have been identified as containing dot-matrix printed text and filter that text, essentially improving the read accuracy of the dot-matrix printed text without affecting the read accuracy of typewritten text.

SUMMARY OF THE INVENTION

The present invention provides a system which is able to examine the video image data of characters (both typewritten and dot-matrix) so that the two types of printing can be identified and located.

Accordingly, dot-matrix image data is filtered when identified without filtering typewritten text, all this being determined by the detection algorithm.

It is an objective of the present invention to perform the above-mentioned procedure without the need to perform the task on each sub-section of the image.

It is another objective of the present invention to process the image data as described above without any reduction in throughput of the image data from the scanning device at the full data rate of said scanning device.

BRIEF DESCRIPTION OF THE DRAWINGS

FIG. 1A is an illustration of a bit-map of a b 9-pin dot-matrix printed "R";

FIG. 1B is an illustration of a bit-map of a typewritten letter "R";

FIGS. 9A, 9B and 9C are block diagrams of the auto-detection circuit for the hardware implementation;

FIG. 10A illustrates the vertical alignment that is necessary by the line store registers of FIG. 9A;

FIG. 10B illustrates the RAM look-up tables and how they are implemented;

MODES OF CARRYING OUT THE INVENTION

Detector

The one characteristic that identifies a dot-matrix printed character from a typewritten character is the inherent discontinuities. Referring to FIG. 1A, it can be seen that a dot-matrix printed letter "R" 10 is comprised of individual dots 12 and spaces (discontinuities) 14. FIG. 1B is the bit-map of a typewritten letter "R" 16 (note that this type of character lacks the discontinuities 14 found in FIG. 1A). By eliminating the discontinuities 14 of the dot-matrix printed text 10, the OCR algorithm is supplied with additional information improving character recognition.

Figure 2:
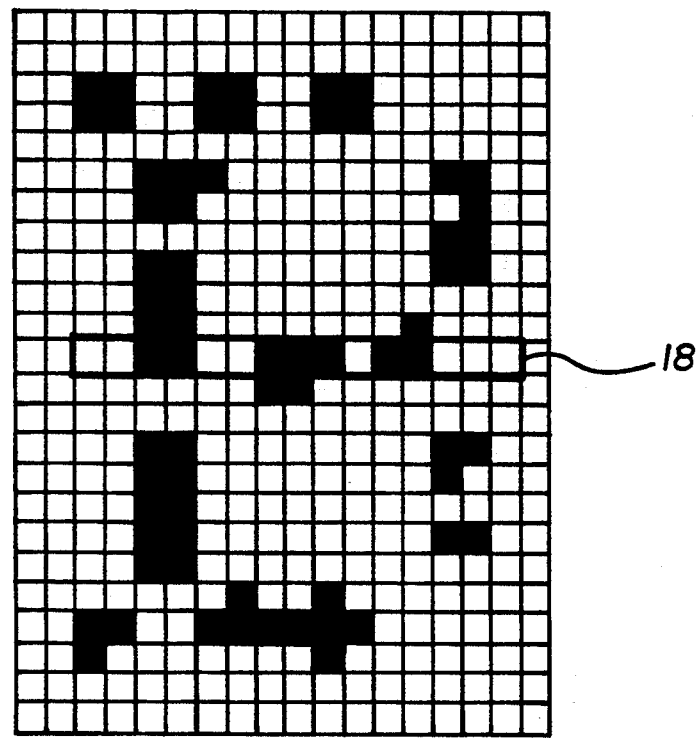
FIG. 2 is actual bit-mapped video data of the 9-pin dot-matrix printed letter "B" scanned at 200 dots per inch.

The principle behind detecting dot-matrix printed text is to process the bit-mapped image data of a character and search for the inherent discontinuities. FIG. 2 is actual video data of a dot-matrix printed letter 'B' scanned at 200 DPI. The highlighted box 18 contains a particular bit-pattern. In fact, if one examines many different sequences of pixels in the horizontal, vertical, and left- and right-diagonal directions, bit-patterns similar to this one can be identified.

Figure 3:
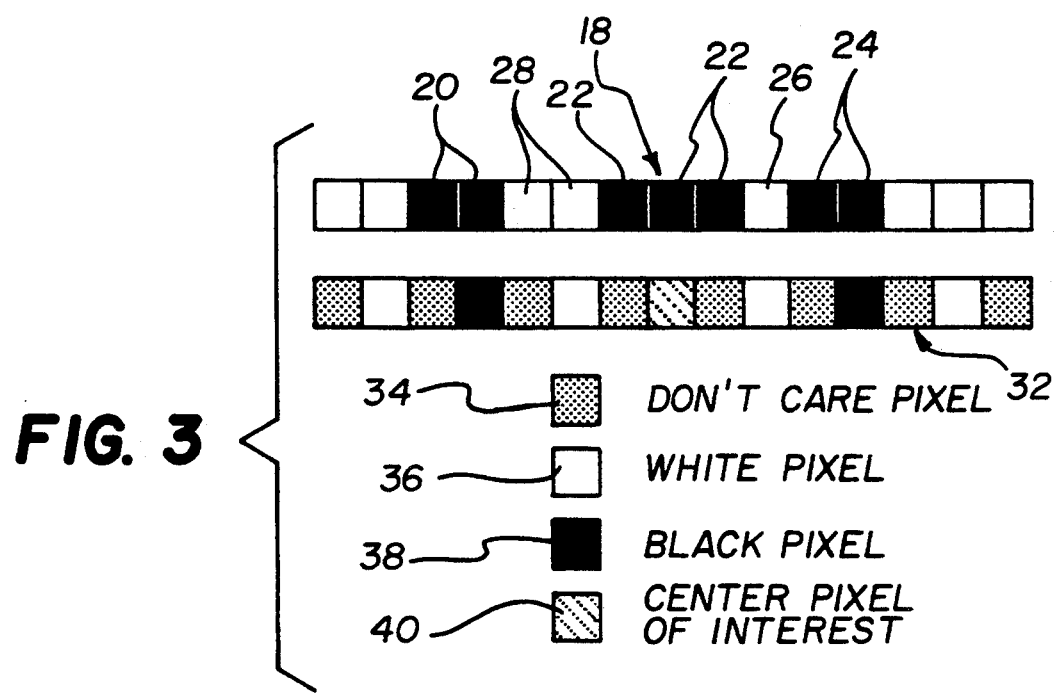
FIG. 3 is the horizontal bit pattern highlighted in FIG. 2.

The bit-pattern highlighted in box 18 in FIG. 2 is shown in FIG. 3. Note that there are three groups of black pixels 20, 22, and 24 separated by white pixels 26 and 28. In fact, by examining FIG. 2 closely (pixel by pixel) in all four predefined directions (horizontal, vertical, and left- and right-diagonal), eight sequences of pixels can be found with similar characteristics. The groups' characteristic bit-pattern can be generalized by the sequence of pixels shown in the characteristic bit-pattern 32 and is the bit-pattern used throughout this paper for detecting dot-matrix printed text. The lightly stippled pixels 34 represent don't care pixels in the kernal and indicate that that particular pixel is not used in determining the presence of dot-matrix printed text. The white pixels 36 are pixels in the kernal which represent the discontinuities 14 shown in FIG. 2 inherent to dot-matrix printed text. The black pixels 38 are the pixels in the kernal which represent the dots 12 that make up the dot-matrix printed character 10 of FIG. 2. The cross-hatched center pixel 40 is the pixel of interest and represents the center of the pattern to be used for detection. All predefined direction patterns share a common center pixel of interest, pixel 40 (by necessity, this pixel must also be black). Similar bit-patterns can be implemented depending on x- and y-dot pitches and x- and y-scanning resolutions.

Figure 4:
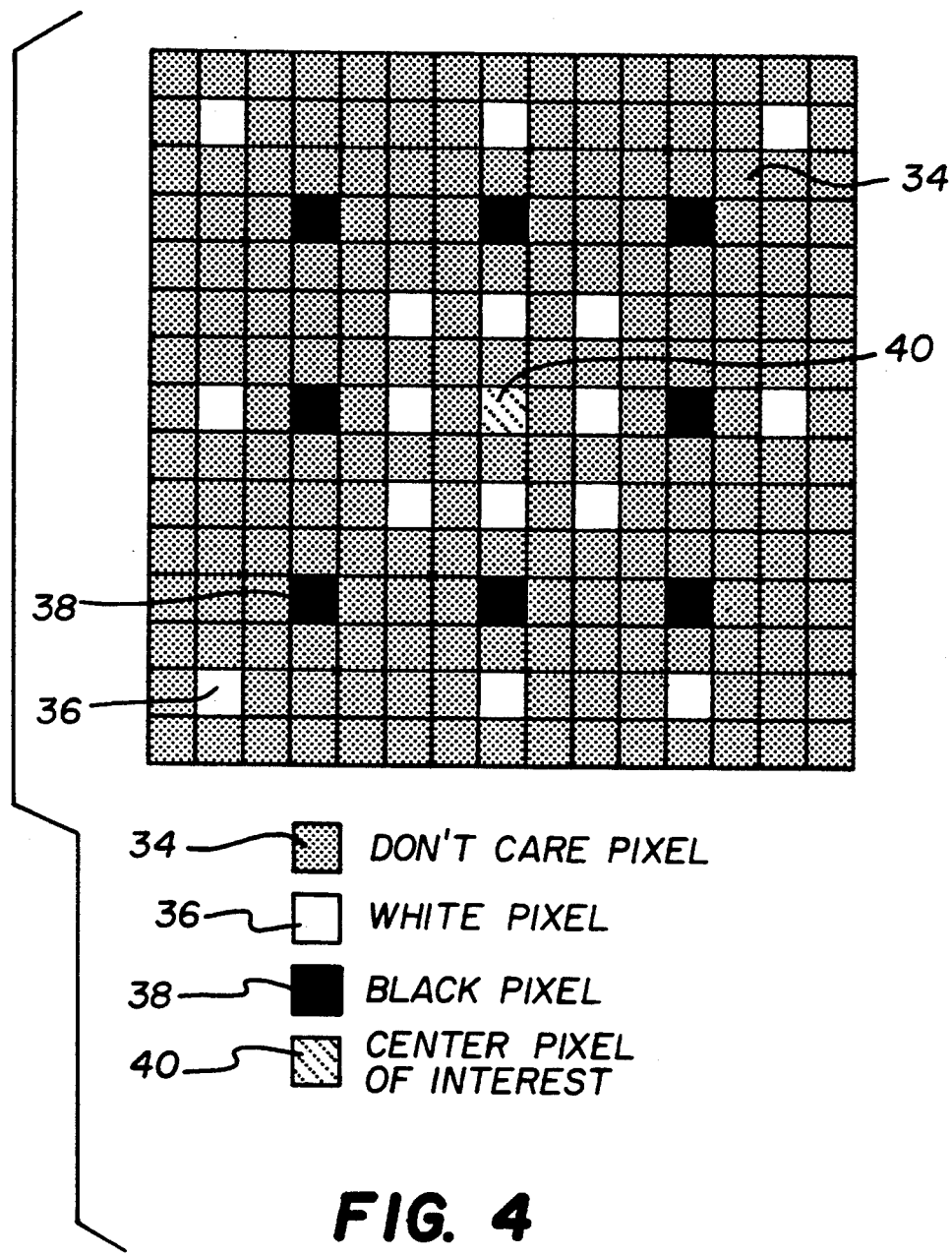
FIG. 4 is a two-dimensional representation of the generalized bit pattern of FIG. 3 expanded in the four directions, horizontal, vertical, and left- and right-diagonals.

By expanding this one-dimensional principle into two dimensions, a matrix of pixels can be created as shown in FIG. 4. The lightly stippled pixels ("don't care" pixels) 34 shown are pixels that do not contribute to the detection of dot-matrix characters. Note that the generalized one-dimensional bit-pattern in FIG. 3 is duplicated in the four directions (horizontal, vertical, left- and right-diagonals) of FIG. 4.

If a bit-pattern in the image data (about a center pixel of interest 40) of FIG. 4 matches the generalized bit-pattern of FIG. 3 in any of the four directions (i.e. each direction is evaluated independently for the given bit-pattern), then dot-matrix text is present about the center pixel of interest 40. For the bit-pattern defined above, the detector is scanning the character (or document) for three black pixels 38 (perhaps the centers of three dots from a dot-matrix printed character) separated by at least one white pixel 36 (the space between the dots) in any of the four predefined directions. The "don't care" pixels 34 show that neither the size of the dot nor the ratio of black to white pixels is important. The only requirement for detecting dot-matrix characters is that at least three black pixels 38, separated by white pixels 40, are arranged in a straight line in any of the four predefined directions within an area.

Figure 5:
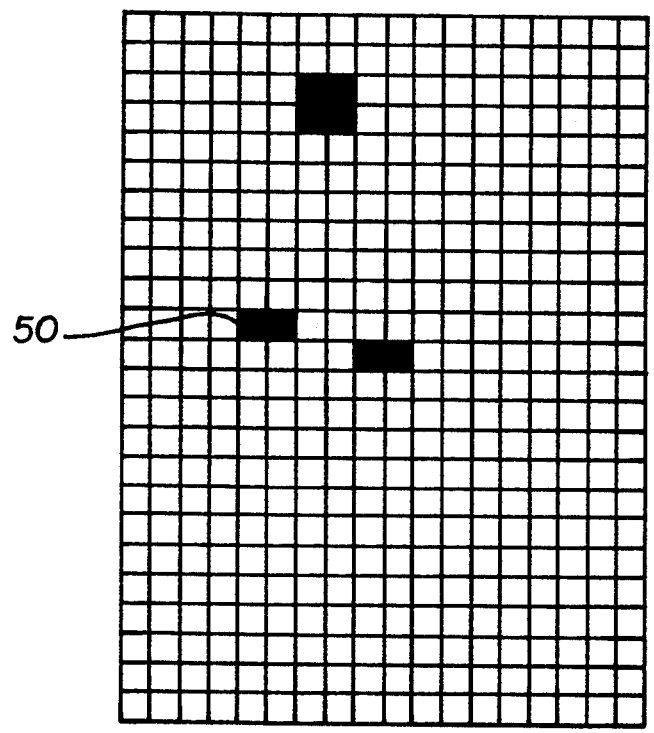
FIG. 5 is a map which illustrates the center pixels of interest about which dot-matrix printed text has been detected.

By scanning the bit-mapped image data (pixel by pixel), from left to right and top to bottom, for the desired bit-pattern and noting the locations of the center pixels of interest, an initial filter mask can be created which identifies the center pixels of interest 40 about which dot-matrix printed text has been detected as they relate to the original image. FIG. 5 shows this first step in creating the filter mask for the character shown in FIG. 2. Note that for this particular dot-matrix character, only 1.85% of the pixels have been determined to be dot-matrix center pixels 50 of interest. Yet this is enough information, as will be shown later, to filter the entire image of the character without affecting adjacent characters.

Figure 6:
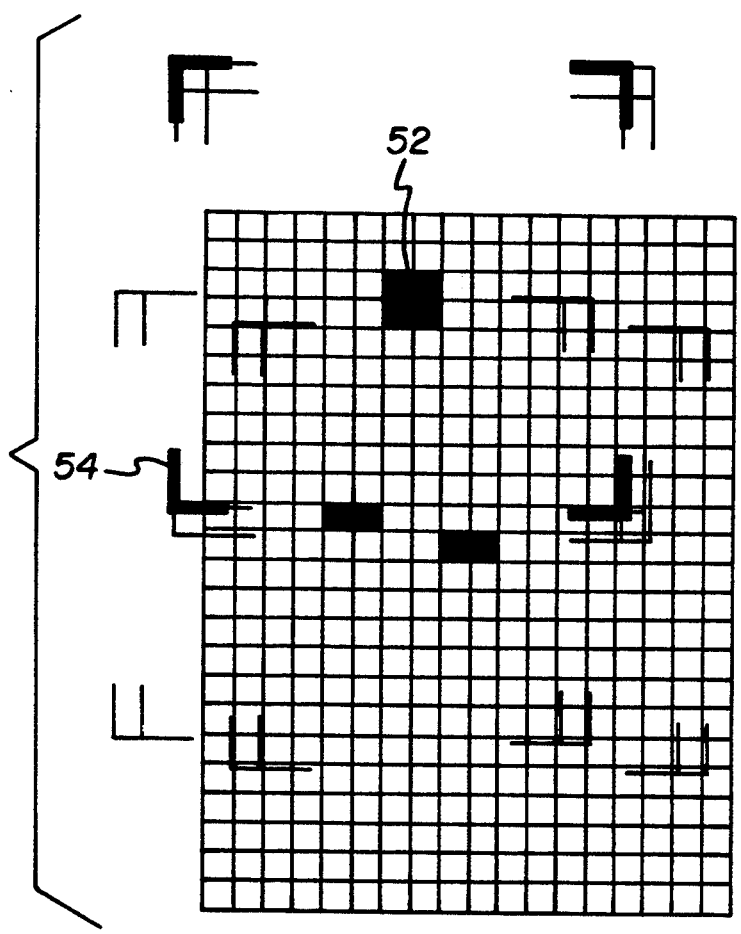
FIG. 6 illustrates the expanded 15×15 pixel regions about the center pixels of interest where dot-matrix printed text has been detected.

Referring to FIG. 6, once it has been determined where the dot-matrix center pixels of interest 52 are located, a two-dimensional region 54 about the center pixels of interest 52 can be drawn For this particular example a 15×15 region 54 was used.

Figure 7:
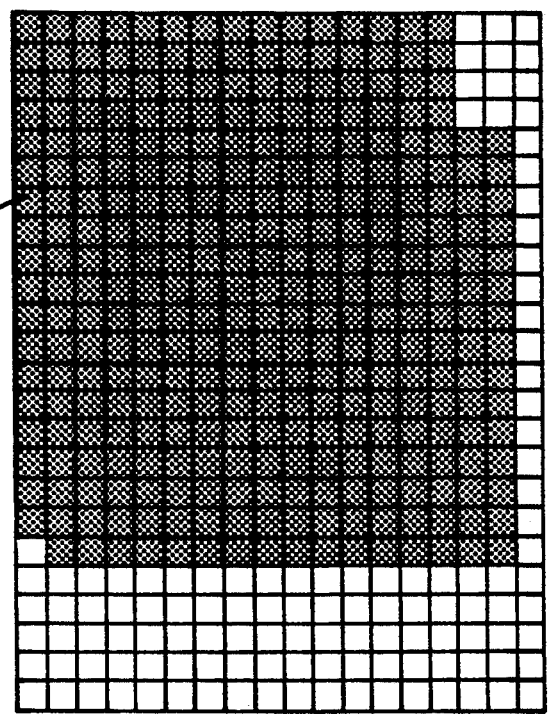
FIG. 7 is the filter mask to be used to process the video of FIG. 2.

From the bounding regions 54 of FIG. 6, the final filter mask can be created to include all pixels within the 15×15 regions 54 surrounding the center pixels of interest 52 that should be filtered. FIG. 7 illustrates what the filter mask 56 looks like after including the regions 54 which surround the center pixels of interest 52 in FIG. 6.

Figure 8A:
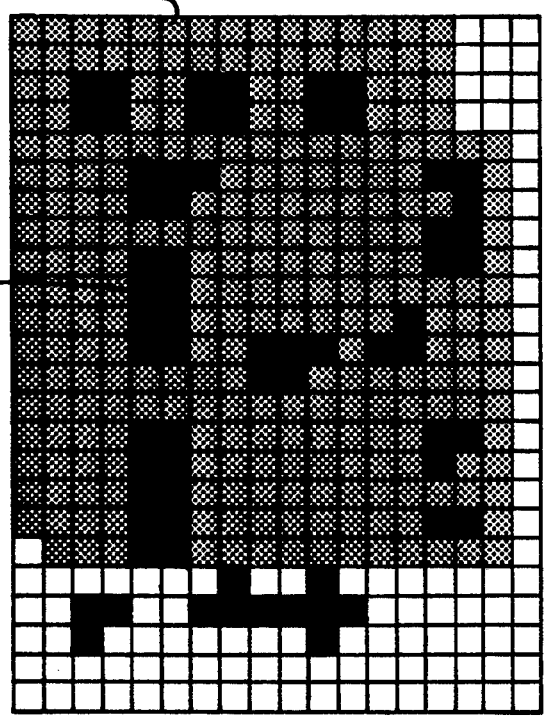
FIG. 8A shows the image of FIG. 2 overlaid by the filter mask of FIG. 7.
Figure 8B:
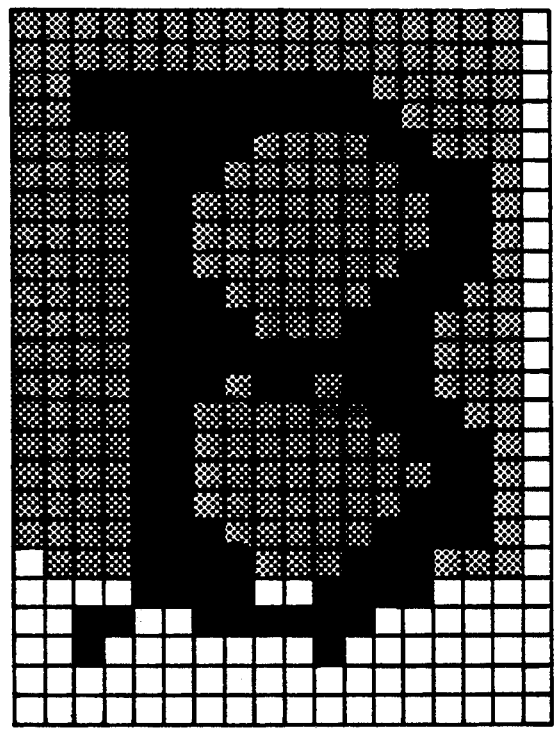
FIG. 8B shows the final image after applying the filter to the image of FIG. 2 with FIG. 7 as the bounding region.

By overlaying the image of FIG. 2 with the filter mask 56 of FIG. 7 as shown in FIG. 8, it becomes apparent which areas of the image are to be filtered and which areas shall remain unfiltered. In FIG. 8B, the shaded region represents the filter mask 56 and the area which will be processed by the filter. FIG. 8B illustrates the final filtered image.

The detection algorithm has been implemented with discrete logic circuits. In order to maximize throughput, the circuit has been designed to process the image data in real-time (i.e. at the full data rate of the scanning device).

Figure 9C:
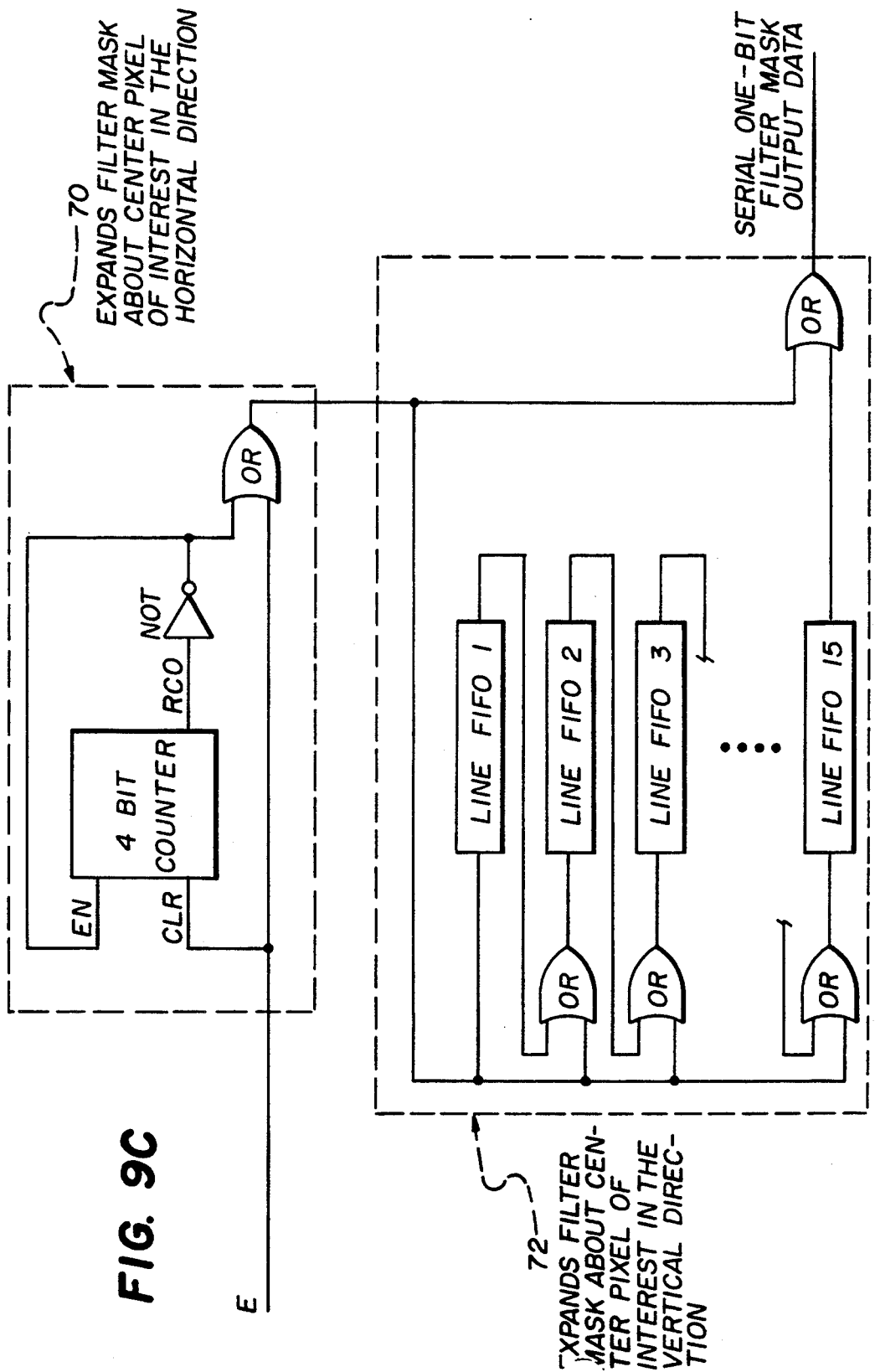

The hardware implementation of the detector circuit consists of four sections as shown in FIGS. 9A, 9B, and 9C (1) the line store registers 122 for temporary storage of scan line data, (2) the look-up tables 60 used to examine the matrix and create the filter mask 56 of FIG. 8, (3) the 15×15 pixel register matrix 124, and (4) the circuit to expand about the center pixels of interest. In addition, an interface exists which allows the above three circuits to be linked to the microprocessor for downloading look-up table data and passing any control/status bytes from/to the microprocessor.

The process described above was presented in such a way that the 15×15 kernal could be thought of as being shifted across the bit-mapped image data to be examined. The hardware implementation of the present invention is done in the same way except that the bit-mapped image data can be thought of as being shifted across a stationary 15×15 kernal as described below.

However, before describing the circuit, a brief discussion of the transmission of image data is required. It should be understood that the binary image data is synchronously transmitted serially starting in the upper left-hand corner of the image. The data is transmitted to the circuit one pixel at a time from left to right across the scan line. Once a complete scan line has been transmitted, the next scan line is sent in the same format. Similarly, the output is serially transmitted on a pixel by pixel basis from left to right and top to bottom.

The line store registers 122 of FIG. 9A consist of memory device(s) capable of storing M (vertical dimension of the 15×15 kernal 124) complete scan lines. Each line store register 122 is capable of shifting binary data in serially in such a way that the first pixel shifted in is the first pixel shifted out. A First In, First Out (FIFO) line buffer is such a device. Since a 15×15 kernal has been used throughout this document, 15 line store registers 122 are required for this embodiment. The purpose of the line store registers 122 is to maintain the vertical alignment of the scan lines being examined at any given time. In other words, the use of the line store registers 122 insures that the first pixel of a given scan line will be above or below the first pixel of the previous or next scan line, respectively. FIG. 10A shows the vertical alignment principle that is necessary. Pixel 1 of line n+2 is vertically aligned over pixel 1 of line n+1 which in turn is aligned with pixel 1 of line n.

FIG. 9A shows a 15×15 kernal 124. The kernal is a matrix of 225 D-type flip-flops arranged in such a way that the output of 124*aa* feeds the input of 124*ab*, 124*ab* feeds 124*ac*, and so on. Similarly, 124*ba* feeds 124*bb*, 124*bb* feeds 124*bc*, etc.

The line store register 122*o* output feeds the kernal element 124*oa* and eventually feeds line store register 122*n* via the 15×15 kernal 124. Likewise, line store register 122*n* feeds the kernal element 124*an* which in turn feeds line store register 122*m* and so on. In the case of the last line store register 122*a*, the output feeds the kernal 124*aa*. The output of the kernal 124*ao* is then used as the output of the circuit rather than input to another line store register.

A block diagram of the horizontal look-up table 60 is shown in FIG. 9B. A Random Access Memory (RAM) device can be used for the look-up table 60*a*. The output of each kernal element 124*ha*–124*ho* is used as an address bit to the horizontal RAM device. FIG. 10B illustrates the implementation detail of using a RAM device as a look-up table. Similarly, the other directions are handled with independant RAM devices. The four RAM devices corresponding to the four predefined directions are then OR'ed together effectively searching for the desired bit pattern in any of the four directions. The output of this section corresponds to FIG. 5.

The expander circuit of FIG. 9C is used to expand the filter mask about the center pixel of interest. Sub-circuit 70 expands in the horizontal direction. Whenever a center pixel of interest is identified as a dot-matrix center, this circuit expands it in the horizontal direction to 15 pixels.

Sub-circuit 72 then expands this horizontal mask in the vertical direction by 15 lines. Upon completion of this two-dimensional expansion, a filter mask is generated which corresponds to that shown in FIG. 7.

Selective Filtering of Dot-Matrix Printing

Figure 11:
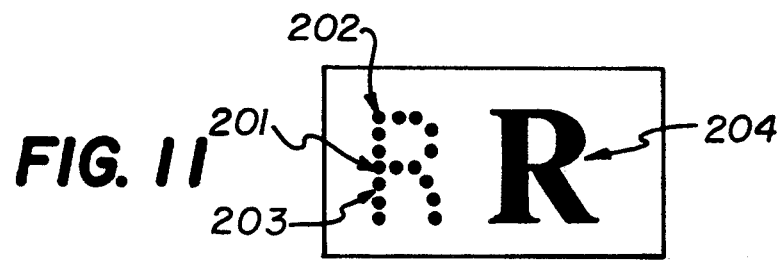
FIG. 11 illustrates what a 9-pin dot-matrix printed letter "R" looks like and how the typewritten letter appears.

FIG. 11 illustrates that a dot-matrix letter "R" 201 is comprised of individual dots 202 and spaces or discontinuities 203. FIG. 11 also shows a typewritten letter "R" 204 which lacks the discontinuities 203 found in a dot-matrix printed character 201. The elimination of discontinuities 203 in the dot-matrix printed character provides additional information to the Optical Character Recognition algorithm improving character recognition.

Figure 12:
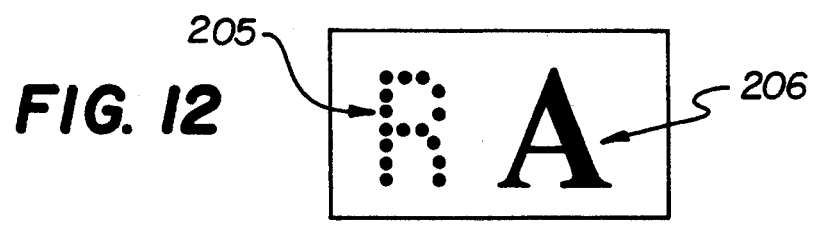
FIG. 12 is an illustration of a dot-matrix letter "R" and a typewritten letter "A"

FIG. 12 illustrates two types of characters. The leftmost image 205 represents the video data of a dot-matrix letter "R". The image on the right 206 is video data of a typewritten letter "A". If FIG. 12 were to be entirely filtered, the typewritten text would not be recognizable by the OCR algorithm. The dot-matrix character, on the other hand, would be recognizable. It is therefore desirable to filter the left image 205 and the unfiltered right image 206 in FIG. 12.

Figure 13:
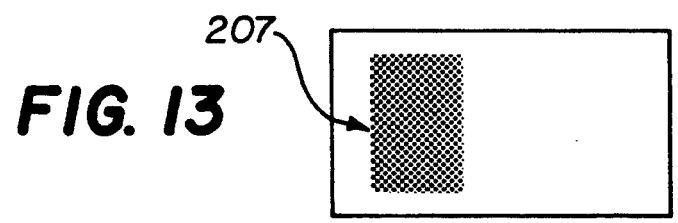
FIG. 13 is an illustration of the filter mask associated with the image of FIG. 12.

To distinguish between dot-matrix text and typewritten text, a filter mask is generated as described above. In doing so, regions of dot-matrix text are located. Such a filter mask is shown in FIG. 13. Note that this filter mask includes a region 207 which indicates the location of the dot-matrix printed character shown in FIG. 12.

Figure 14:
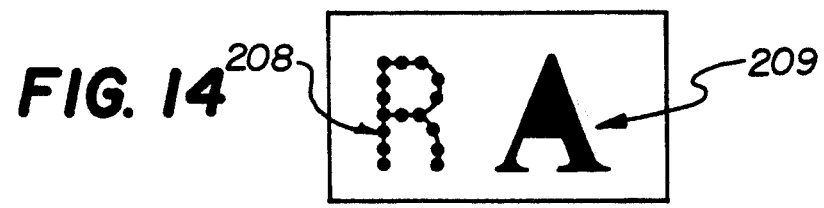
FIG. 14 illustrates the filtered version of FIG. 12.

If the image data were completely filtered by the previously described algorithm, then the video for the image would exist as shown in FIG. 14. Note that the video data for the dot-matrix printed character 208 has been corrected, improving OCR accuracy when using an OCR algorithm trained for machine print. On the other hand, the video data for the typewritten character 209 has been degraded by the filter making OCR recognition less accurate for that type of character.

Figure 15:
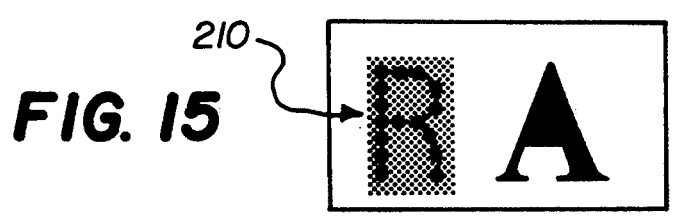
FIG. 15 is an illustration of the image of FIG. 14 with the filter mask of FIG. 13 overlaid.
Figure 16:
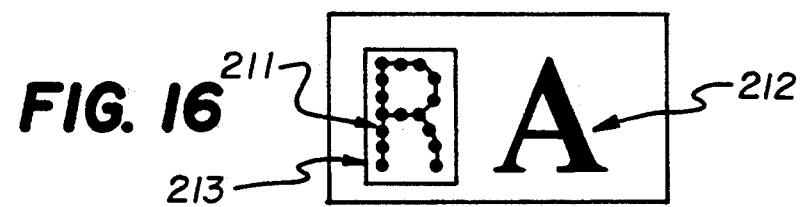
FIG. 16 illustrates the results of copying image data highlighted in FIG. 15, and overwriting the image data in the original image of FIG. 12, filtering only those regions deemed to contain dot-matrix printed text.

By overlaying the image data of FIG. 14 with the filter mask of FIG. 13, the region 210 where dot-matrix printed text is present in the original image is defined as shown in FIG. 15. Once the region 210 has been defined, one can visualize a copy and paste operation where the region 210 that has been determined to contain dot-matrix printed text is copied from the filtered image and pasted in the corresponding location in the original image, effectively filtering only those regions known to contain dot-matrix printed text. The result of the copy and paste operation is shown in FIG. 16. Note that the filtered version of the dot-matrix printed character 211 has been filtered while the typewritten character 212 remains unchanged. The region 213 shows the area copied from FIG. 15.

Figure 17:
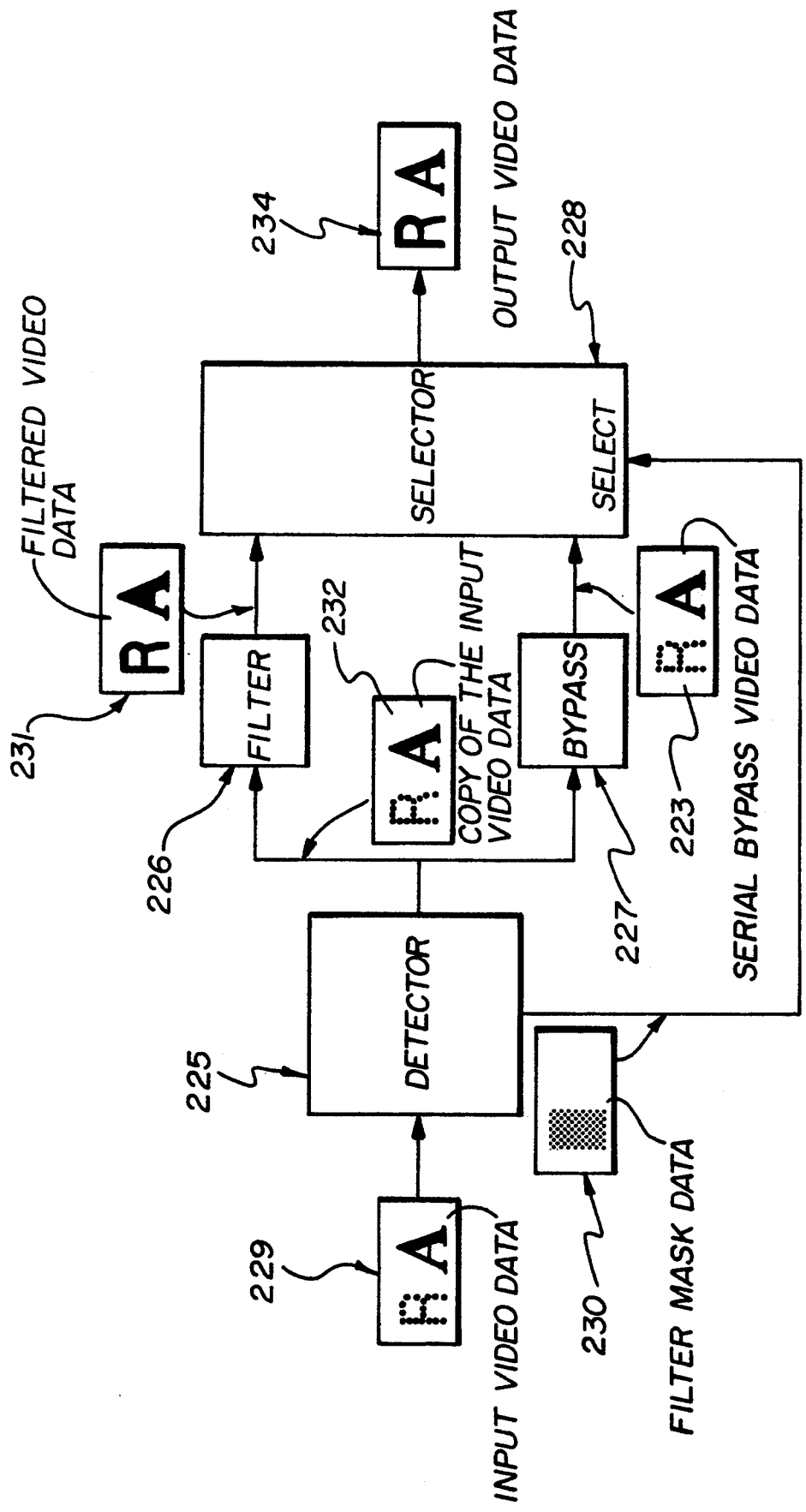
FIG. 17 is a block diagram illustrating the hardware system described in the text.

FIG. 17 is a block diagram of the system. In an effort to help understand the hardware implementation, the figure has diagrams associated with the various steps occurring in the hardware which can be cross-referenced to FIGS. 12–16.

Input video data 229 is serially input to the detector 225. The purpose of the detector 225 is to examine the serial input data 229, serially output a copy of the input data 232, and serially output filter mask data 230 which identifies the location of each dot matrix printed character within the binary image.

The serial copy of the input video data 232 is then serially fed simultaneously to both the filter circuit 226 and the bypass circuit 227. The filter circuit 226 filters the entire image regardless of the presence of dot-matrix printed text. Filtered video data 231 is output in a serial fashion to selector 228. The bypass circuit 227 is used to simply delay the serial copy of the input data 232. The selector 228 has two inputs from which to chose, the serial filtered video data 231 and secondly, the serial bypass (unfiltered) video data 223. The selection is based on the output of the filter mask data 230. The selector 228 selects the appropriate data stream and outputs the processed output data 234.

It is important that pixel alignment be maintained between the serial filtered video data 231 and the serial bypass video data 223. That is, pixel number one of the serial filtered video data 231 should have a corresponding serial bypass video data pixel. Similarly, these pixels should have a corresponding filter mask element and should be the first element in the filter mask data 230.

Figure 18:
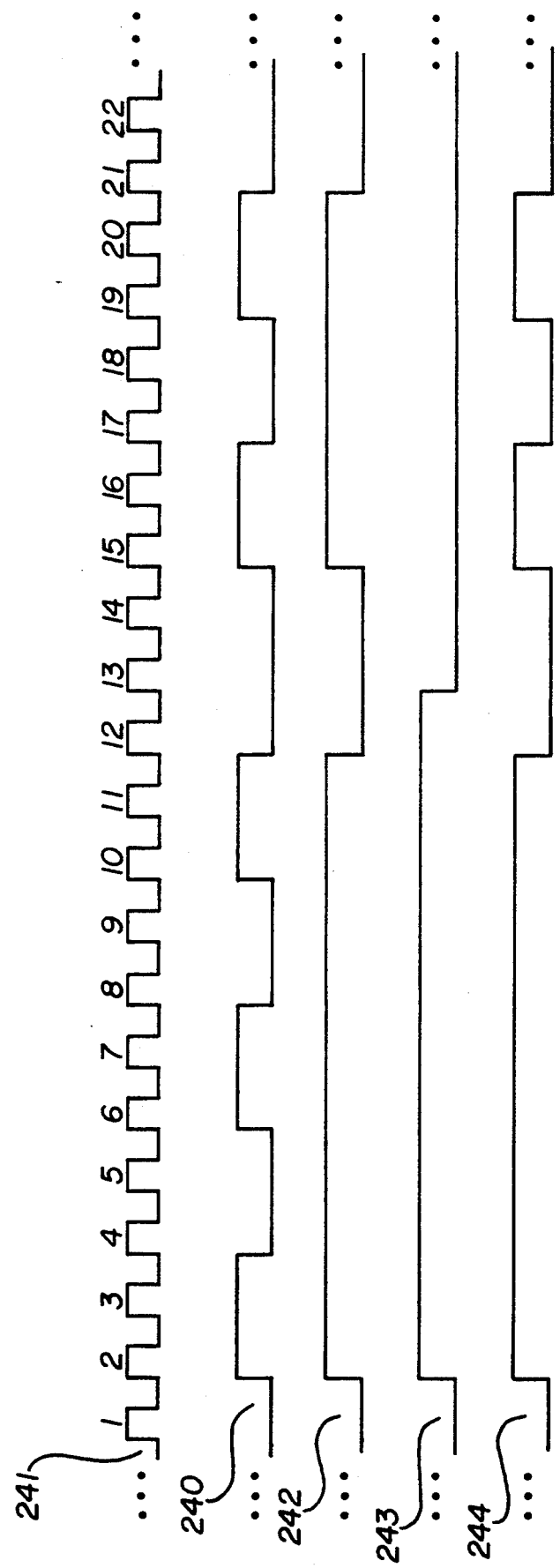
FIG. 18 illustrates a timing diagram showing the timing relationships required to properly select between filtered and unfiltered video data "on-the-fly".

FIG. 18 illustrates a timing diagram where the second signal trace 240 shows a sample of bypassed serial video data synchronized to a pixel clock 241. Pixel number two of the second signal trace (bypassed serial video data) 240 is at a logic level 1. It has a corresponding filtered pixel (pixel number two) in the third signal trace 242 which is also at logic level 1. It should be understood that both these signals 240 and 242 are aligned in the time domain. Accordingly, the selector 228 has access to both signals 240 and 242 at the same instant in time, allowing it to select between filtered and unfiltered video data "on-the-fly" in real time. To accomplish this real time processing, a third signal is required. This signal is shown in FIG. 18 as the fourth signal trace 243. It corresponds to the filter mask data output from detector 225 of FIG. 17. As each pixel is processed by detector 225 of FIG. 17, the detector outputs a filter mask for each pixel indicating whether that particular pixel should be filtered or not. In the case of pixel number two of the above example, the detector has determined that pixel number 2 should be filtered as shown by logic level 1 of the fourth trace 243 in FIG. 18, which corresponds to pixel number two.

Thus, the output signal 244 for pixel number 2 is the filtered image. If the filter mask had been a logic 0, the unfiltered image would have been selected for the particular pixel. An example of this would be pixel 18 in FIG. 18. The output pixel would be an unfiltered version of the image data. The following equation can be used to define the selector 228 of FIG. 17:

output = ((select) and (filter)) or ($\overline{\text{select}}$) and bypass))

The above Boolean equation shows that if the filter mask (referenced as the "select" variable in the above equation) is 1 for a given pixel, then the output would be a filtered pixel (referenced as the "filter" variable in the equation). If filter mask is not a 1 for a given pixel, then the output would be a bypassed pixel (referenced as the "bypass" variable in the above equation). By maintaining the alignment of pixels in both the filtered data shown and the bypass data stream, with the corresponding filter mask element, it is possible to filter only portions of the image in real time "on-the-fly" based on the filter mask.

Although the preferred embodiment describes a binary video system, the same principles could be applied to a grey-scale system.

Experimental Results

Test results show read rates for dot-matrix printed documents vs. typewritten documents were as follows in Table 1 for a given set of documents (read rates will vary depending on the specific document used).

TABLE 1

| Text Type | No Dot Matrix Processing | With Selective Filtering |
|---|---|---|
| Dot-Matrix | 92.4% | 98.0% |
| Typewritten | 99.9% | 99.2% |

From this preliminary data, it can be seen that the system significantly improved read rates of dot-matrix printed text. In addition, it did not significantly affect typewritten text. As a result, if it is not known what type of text to expect, then the use of the auto-detection algorithm is beneficial.

Advantages and Industrial Applicability

The method and apparatus of the present invention is intended to improve OCR read rates of dot-matrix printed text without significantly affecting typewritten text. Specifically, the algorithm examines the binary image data and determines whether discontinuities exist in character image data. It has been found through experimentation that the bit pattern shown in FIG. 4 works well for dot-matrix printed characters scanned at 200 dots per inch.

By properly programming the detection RAM banks, it may be possible to search for any other bit-patterns. Perhaps it would be desirable to detect discontinuities in line art that has been digitized.

What is claimed is:

1. Apparatus for the selective filtering of dot-matrix printed characters in a document containing dot-matrix printed characters and other types of printed characters scanned pixel by pixel and providing a signal indicating the location in the document image where said dot-matrix printed characters are detected, said apparatus comprising:

means for scanning a document to provide an input video data signal;

means for detecting the presence of dot-matrix printed characters in said input video data signal and generating a filter mask signal;

means for filtering said input video data signal along a first path;

means for delaying said input video data signal by a predetermined amount along a second path;

means for selecting filtered video data of a dot-matrix character from said first path in response to the presence of said filter mask signal and selecting unaltered video image data of other types of printed characters from said second path in the absence of said filter mask signal; and outputting a new stream of video image data of altered and unaltered characters recognizable by an optical character recognition algorithm.

2. The apparatus as set forth in claim 1 wherein the detector means and filter means further receive a gray scale input video signal.

3. A method of detecting dot-matrix printing in a document containing dot-matrix printed characters and other types of printed characters scanned pixel by pixel and providing a filter mask indicating the location in the image where said dot-matrix printed characters are present, said method comprising the steps of:

scanning a document to provide an input video data signal;

detecting the presence of dot-matrix printed characters in said input video data signal and generating a filter mask signal;

filtering said input video data signal along a first path;

delaying said input video data signal along a second path;

selecting filtered video data of a dot-matrix character from said first path in response to the presence of said filter mask signal and selecting unaltered video image data of other types of printed characters from said second path in the absence of said filter mask signal; and outputting a new stream of video data of altered and unaltered characters recognizable by an optical character recognition algorithm.

4. The method as set forth in claim 3 wherein said input video data signal is a gray scale signal.

* * * * *